United States Patent [19]

Fujinaga

[11] Patent Number: 5,153,868
[45] Date of Patent: Oct. 6, 1992

[54] MAGNETO-OPTIC RECORDING AND REGENERATING DEVICE

[75] Inventor: Teruaki Fujinaga, Osaka, Japan

[73] Assignee: Sumitomo Metal Industries, Ltd., Osaka, Japan

[21] Appl. No.: 315,166

[22] Filed: Feb. 24, 1989

[30] Foreign Application Priority Data

Feb. 26, 1988 [JP] Japan .................. 63-44851
Aug. 8, 1988 [JP] Japan .................. 63-198287
Oct. 14, 1988 [JP] Japan .................. 63-259837

[51] Int. Cl.⁵ .................. G11B 7/08; G11B 11/12; G11B 13/04
[52] U.S. Cl. .................. 369/110; 369/121; 369/122; 369/124; 369/13; 360/114
[58] Field of Search .................. 369/13, 110, 121, 122, 369/124; 360/59, 114; 365/122

[56] References Cited

U.S. PATENT DOCUMENTS

| | | | |
|---|---|---|---|
| 3,094,699 | 6/1963 | Supernowicz | 360/59 |
| 3,228,015 | 1/1966 | Miyata et al. | 365/122 X |
| 3,512,168 | 5/1970 | Bate | 360/59 |
| 3,521,294 | 7/1970 | Treves | 360/59 |
| 3,781,905 | 12/1973 | Bernal et al. | 360/59 |
| 4,618,901 | 10/1986 | Hatakayama et al. | 360/114 |
| 4,660,187 | 4/1987 | Yoshino et al. | 369/13 |
| 4,694,358 | 9/1987 | Muchnik et al. | 360/59 |

FOREIGN PATENT DOCUMENTS 1160057 7/1969 United Kingdom .

*Primary Examiner*—Hoa Nguyen
*Attorney, Agent, or Firm*—Burns, Doane, Swecker & Mathis

[57] ABSTRACT

A magneto-optic recording and regenerating process and the device using it in accordance with the present invention are intended to magnetize the magnetic, or magnet, film of a disk parallel to the plane of the magnetic film to record or erase information. When regenerating information, light beams whose incident plane is substantially perpendicular to the direction of magnetization of the recording medium is applied to the disk, so that the recorded information is regenerated dependent on the light intensity of reflected light obtained in response to the direction and magnitude of magnetization of the disk. Additionally, the magneto-optic disk includes a magnetic film having a coercive force smaller than the saturated magnetization at room temperature, so that irradiating light beams elevate the temperature of the magnetic film but not up to its Curie temperature. Information is then recorded on or erased from the magnetic film with its coercive force decreased by the elevated temperature.

3 Claims, 7 Drawing Sheets

DIRECTION OF RECORDING TRACK

Fig. 10(b)

DIRECTION OF RECORDING TRACK

MAGNETO-OPTIC RECORDING AND REGENERATING DEVICE

BACKGROUND OF THE INVENTION

1. Field of the Invention

The present invention relates to a magneto-optic recording and regenerating process for recording and regenerating information by employing the magneto-optic effect, a device using the process, and a magneto-optic disk.

2. Description of the Prior Art

With high degree of information, information file devices of higher capacity and density has been required and the magneto-optic disk unit has attracted attention as an erasable high-density recording device.

Figure 2:
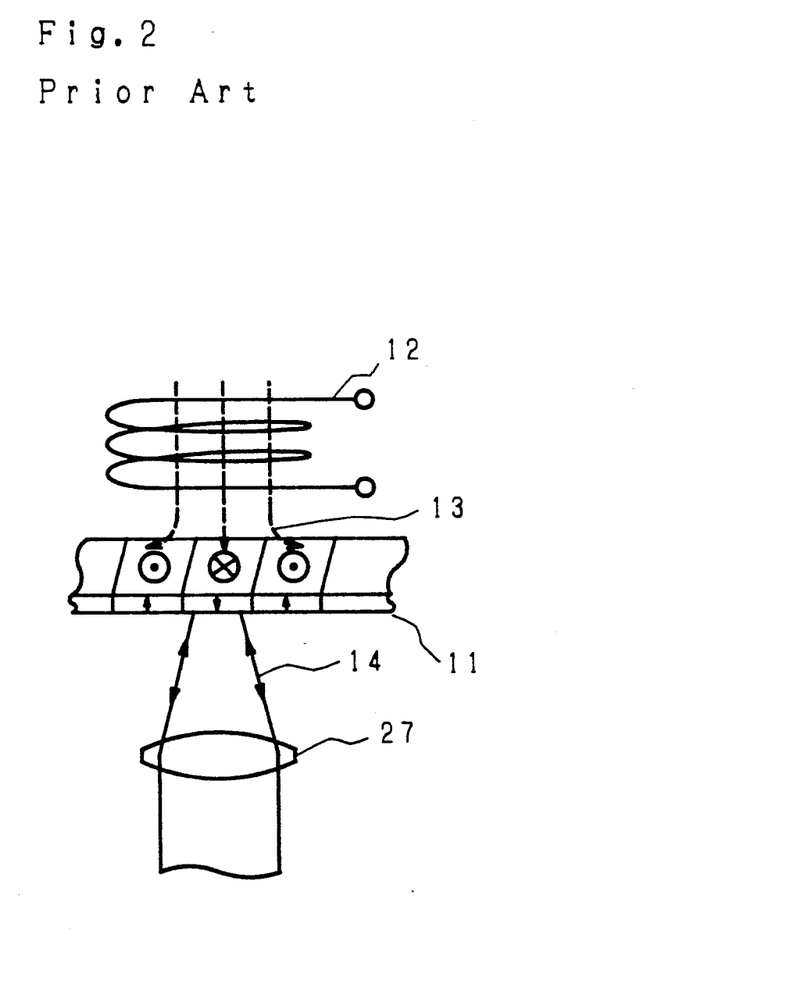
FIG. 2 is a schematic view showing conventional recording method.

FIG. 2 is a view schematically showing the magneto-optic recording system in a conventional magnetio-optic disk unit, in which laser light beams 14 condensed by an objective lens 27 are applied to a perpendicular magnetic film 11 which has been magnetized normal to the plane of the magnetic film with its surface facing toward one direction, namely upward in FIG. 2, so that the temperature of the irradiated areas will be elevated in the vicinity of the Curie point at least or higher than the compensating temperature to reduce the coercive force of the film 11. Furthermore, the direction of magnetization is reversed by impression of an external magnetic field facing downward in FIG. 2, namely, in the direction opposite to the magnetizing direction of the perpendicular magnetic film 11 in respect of a magnetic field generating source 12 consisting of an electric magnet and the like, thereby storing information in the perpendicular magnetized film 11.

When erasing the recorded information in the perpendicular magnetic film 11, the external magnetic field in the same direction as the initial magnetizing direction of the perpendicular magnetic film 11 (upwardly in FIG. 2) as well as the condensed laser light beams irradiate the film, which will be then magnetized in the upward direction in accordance with the similar principle to that as in the recording, resulting in the information being erased.

The polar Kerr effect is used in regenerating the information recorded in the perpendicular magnetic film 11. A linear polarized light irradiated the perpendicular magnetic film 11 will turn into a reflected light rotating clockwise or anticlockwise in response to the magnetizing direction, and this rotation will be converted to the change of light volume by such as an analyzer to obtain a regenerated signal.

Figure 1:
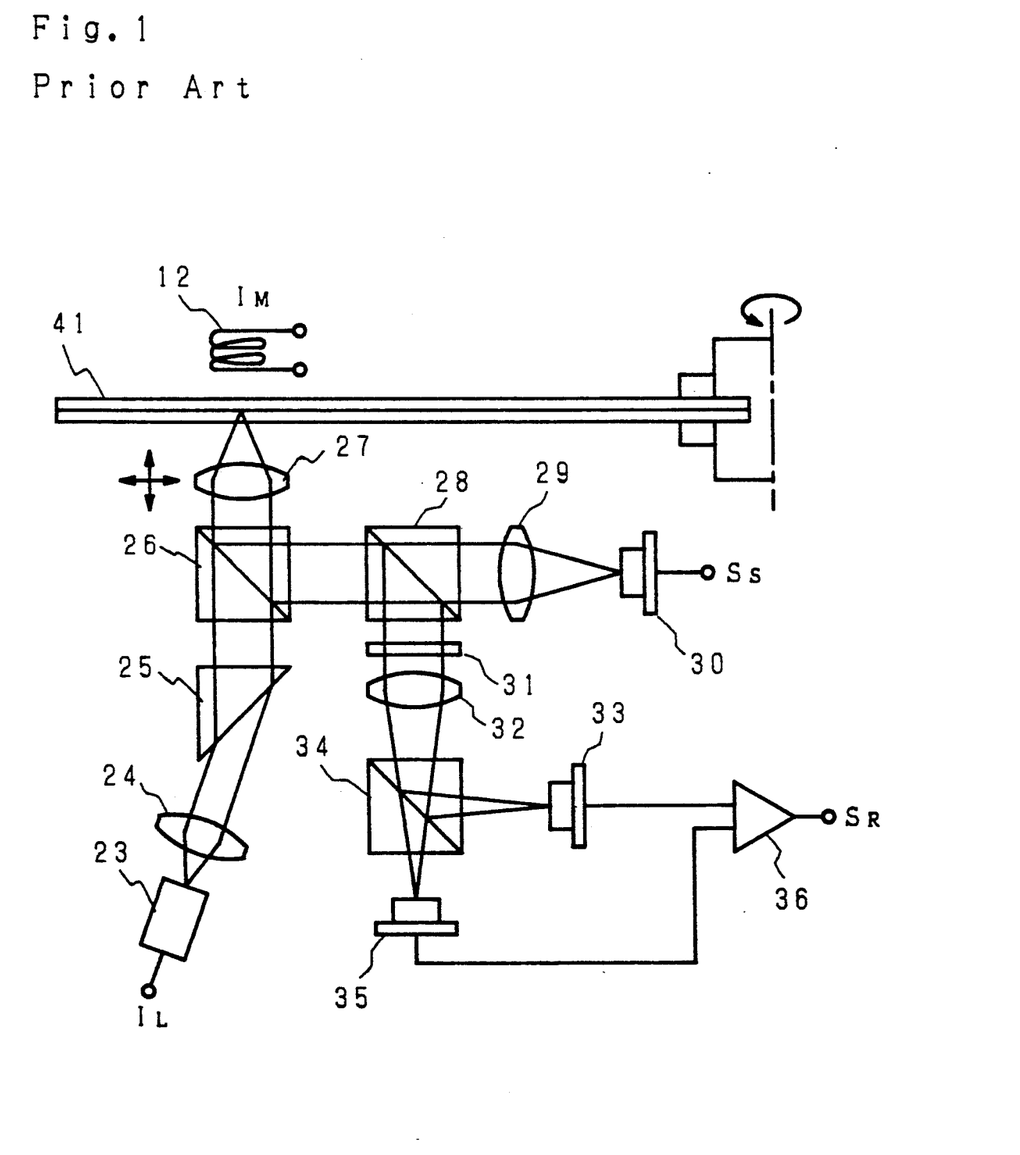
FIG. 1 is a block diagram showing the structure of a conventional magneto-optic disk unit.

FIG. 1 is a schematic view showing one embodiment of a substantial part of a conventional magneto-optic disk unit; 41 identifies a magneto-optic disc using a perpendicular magnetic film. The magneto-optic disk 41 has information recording tracks formed concentrically or helically and turns at a high speed around its shaft, and a magnetic field generating source 12 such as electromagnet acts to apply a magnetic field to the magneto-optic disk 41 in a vertical direction.

A laser light beam produced by a semiconductor laser 23 runs through a condenser lens 24, a shaping prism 25 and a beam splitter 26 to be focused into and irradiate the perpendicular magnetic film of the megneto-optic disk 41 by means of the objective lens 27. If the temperature of the magnetic film is elevated by the laser light in the vicinity of the Curie point at least or up to over the compensating temperature, the perpendicular magnetic film will be magnetized in response to a direction in which the magnetic field generating source 12 impresses a magnetic field, whereby the information will be either recorded or erased.

When regenerating information, if a linear polarized light from the semiconductor laser 23 continues to travel through the condenser lens 24, shaping prism 25, beam splitter 26 and objective lens 27 until it irradiates the desired point of area on the perpendicular magnetic film of the magneto-optic disk 41, the polarization plane of a reflected light will revolve depending on the magnetizing direction. This particular polarized light is passed through the objective lens 27, beam splitter 26, another beam splitter 28, a ¼ wavelength plate 31 and the condenser 32 and then separated by a polarizing beam splitter 34 into a component S of polarization and a component P of polarization. The intensity of light of the respective separated components are converted by means of photodiodes 33 and 35 into an electric signal. A differential ammplifier 36 produces a signal corresponding to the rotation of the plane of polarization in view of the difference between the two components, there-by the information will be regenerated, accordingly.

Part of the laser light beams irradiated at the time of recording, regenerating and erasing information is detected by a quadrantal photodiode 30 through the beam splitter 28 and a cylindrical lens 29 and the focusing and tracking of the light beam on the magneto-optic disk 41 is performed.

With such a conventional magneto-optic disk unit, in order to obtain a good recording sensitivity, the perpendicular magnetic film 11 needs to have a thickness of less than 1000 Å in general so that a great demagnetizing field will be produced due to its own magnetization resulting from such a thinner quality, thus reducing recorded magnetization. In this connection, the perpendicular magnetic film 11 must be a substance of high coercive force in order to keep the recorded magnetization. What is known as a substance having such a nature at present is only an amorphous film made of rare earths-transition metals which has a great disadvantage in that it has a small Kerr effect and is subjected to oxidation and corrosion. This limits the selection of the magnetic film materials.

Additionally, the conventional magneto-optic recording system and the device using the system require the impression of a magnetic field perpendicular to the magnetic film, and the applied magnetic field diverges, whereby the distribution of the magnetic filed is not so limited that it is difficult to construct a compact source of generating magnetic field in which the high frequency modulation is possible.

Furthermore, a method for regenerating information in accordance with the conventional magneto-optic disk unit employs the Kerr effect, which allows the plane of polarization of a reflected light of laser beam irradiated the magneto-optic disk slightly rotate in response to the direction of magnetization of the magneto-optic disk. Since, however, a slight amount of rotation is converted by an analyzer such as a polarizing beam splitter light into the variation of the intensity of light to obtain a regenerating signal, which is too small to obtain a sufficient signal-to-noise ratio for regenerating information.

Converting the amount of rotation of the plane of polarization of reflected light into the variation of the intensity of light in accordance with the Kerr effect needs the optical polarization components such as a polarizing beam splitter, ½ wavelength plate and the like, as a result the optical system becomes complicated and it is difficult to reduce the size and weight of the device and therefore to give quicker access.

If the magnetized film is a perpendicular magnetic film, since, magnetization normal to the plane of the thin magnetic film is necessary, a great demagnetizing field will result from the magnetization of the film itself, thereby reducing the recorded magnetization. For example, if the saturated magnetization is $4\pi Ms$, it is necessary to provide a magnetic film having a greater coercive force than the saturated magnetization ($4\pi Ms$) in order to overcome the demagnetizing field which will have an intensity of substantially $4\pi Ms$.

Figure 3:
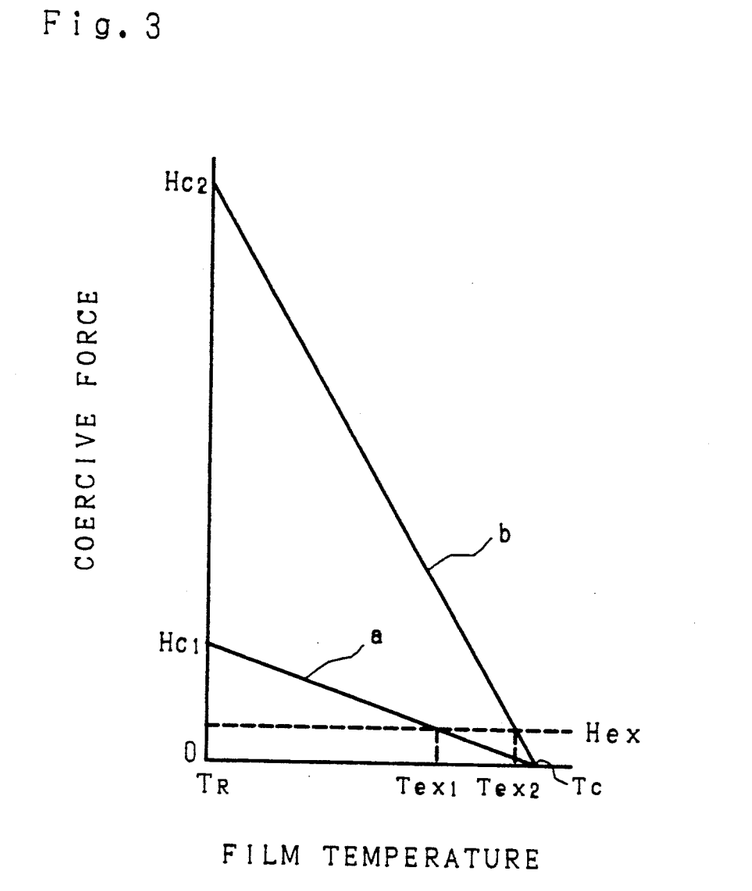
FIG. 3 is a graph showing the film temperature coercive force characteristics of the both magnetic films in accordance with the prior art and the present invention.

FIG. 3 is a graph showing the coercive force-temperature characteristic of a magnetic film in an approximate straight line, wherein the vertical axis shows the coercive force and the horizontal axis shows the temperature of the film. In the drawing, b, which represents the properties of the perpendicular magnetic film wherein a high corecive force $Hc_2$ is required at the room temperature $T_R$. In case of b, since the coercive force is at a high level in the room temperature $T_R$, a comparatively steep gradient is shown by which the coercive force goes down to the Curie temperature Tc, and the film temperature $Tex_2$ in which the magnetization reversal is enabled by the applied magnetic field Hex is relatively in the vicinity of the Curie temperature Tc. In general, the higher the recording sensitivity of the magnetic film, the easier the recording of information, and the recording sensitivity gets higher as the film temperature Tex enabling the magnetization reversal due to the applied magnetic field is at a lower level. Hence, for the purpose of getting high recording sensitivity, it is impossible to utilize the magnetic film in inherent possession of a high Curie temperature for the magneto-optic recording medium.

With a conventional magnetic film as shown in FIG. 3, line b, the film temperature $Tex_2$ where the magnetization reversal is made possible by the applied magnetic field is seen to be in the vicinity of the Curie temperature Tc, and therefore, when a determined area of the magnetic film is heated to more than $Tex_2$ by lasing so as to record or erase the information, it is inevitable that the film temperature will become higher than the Curie temperature Tc due to the energization. Consequently, during the time when the film temperature which has once become higher than the Curie temperature Tc goes down to a little lower than the Curie temperature, i.e. a temperature at which the magnetized wall in the magnetized region where the magnetization reversal took place can be fixed, since any recording or erasing of information cannot be achieved by the magnetization reversal of the magnetic film, for example, in the magnetic field modulation recording, a deviation from the recording or erasing position is liable to occur.

Figure 4:
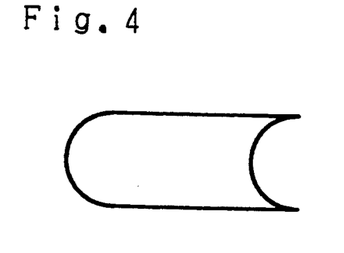
FIG. 4 is a schematic view showing the configuration of a magnetic domain formed in the magnetic film of the prior art.
Figure 5:
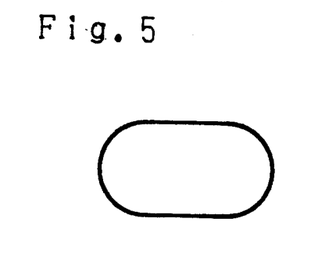
FIG. 5 is a schematic view showing an ideal configuration of a magnetic domain formed in the magnetic film.

FIGS. 4 and 5 are schematic views showing the contigurations of magnetic domains where magnetic walls are fixed. As illustrated in FIG. 5, the configuration of magnetic domain which is symmetrical with respect to the running direction of the laser beam or the rotating direction the disk is the one which facilitates the processing of a regenerating signal, but the part of the magnetic domain heated to the temperature higher than the Curie temperature as described above has its magnetization which fails to reverse until the temperature is lowered to less than the Curie temperature, so that the formed magnetic domain as shown in FIG. 4 lacks the part heated to the temperature higher than the Curie temperature in the magnetic field modulation recording, thus being unsymmetrical with respect to a direction in which the laser beam runs or the disk rotates. Accordingly, when regenerating the information, a regeneration output will become unsymmetric in response to the configuration of the magnetic domain, making it difficult cult to process the regenerating signal.

SUMMARY OF THE INVENTION

The present invention is intended to solve the above problems.

A first object of the present invention is to provide a process for magneto-optic recording and regenerating and a device using the process wherein a wide range of materials may be selected for use in manufacturing a magnetic film.

A second object of the present invention is to provide a process for magneto-optic recording and regenerating and a device using the same wherein a compact magnetic field generating source which is high frequency-modulatable can be used.

A third object of the present invention is to provide a process for magneto-optic recording and regenerating and a compact and light-weight device using the same wherein a large regenerating signal output is generatable and no optical system for polarization is required.

A fourth object of the present invention is to provide a process for magneto-optic recording and regenerating and a device using the same wherein even a use of a magnetized film having a high Curie temperature may secure a good recording sensitivity and an exact recording or erasing positioning is obtained when recording or erasing information.

A fifth object of the present invention is to provide a process for magneto-optic recording and regenerating and a device using the same wherein a regenerating signal may readily be processed.

The above and further objects and features of the invention will more fully be apparent from the following detailed description with accompanying drawings.

DESCRIPTION OF THE PREFERRED EMBODIMENTS

Figure 6:
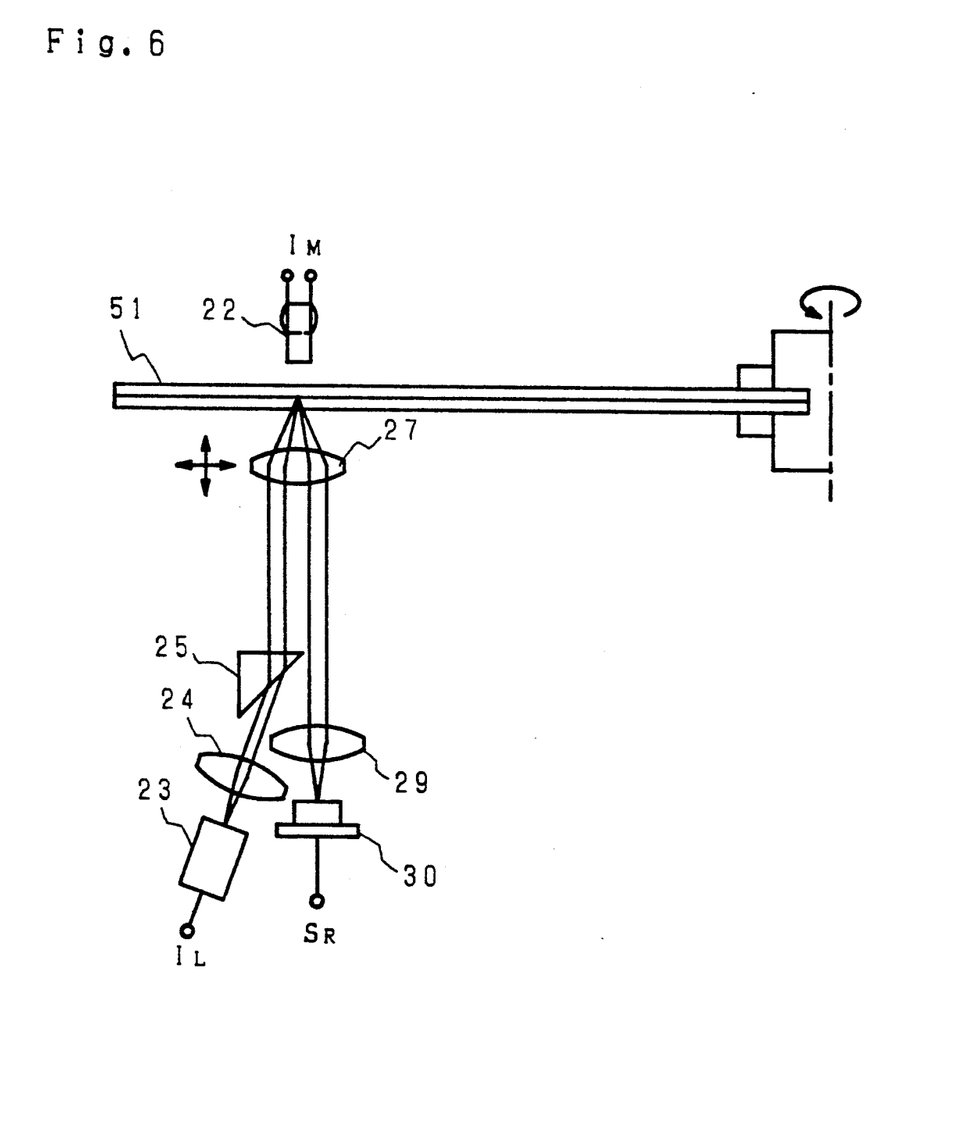
FIG. 6 is a block view showing the structure of one embodiment of the magneto-optic disk unit in accordance with the present invention.

Now, the present invention will be described in detail with reference to the drawings illustrative of the embodiments. FIG. 6 is a view schematically showing one example of the structure of the substantials of the magneto-optic disk unit of the present invention, in which drawing 51 designates a magneto-optic disk using a horizontal or magnetic film which is to be magnetized parallel to the plane of the magnetic film. The magneto-optic disk 51 has tracks formed concentrically or spirally for recording information and rotates around its shaft at high speed. A ring type magnetic head 22 has a yoke arranged by its both ends circumferentially of the magneto-optic disk 51 to impress a magnetic field circumferentially of the magneto-optic disk 51.

A laser light beam emitted from a semiconductor laser 23 is directed through a condenser lens 24 and a shaping prism 25 by an objective lens 27 to the horizontal magnetic film of the magneto-optic disk 51, and when the temperature of the magnetic film increases to about the Curie point or to over compensating temperature, the horizontal magnetic film is magnetized in accordance with the direction of magnetic field impressed by the ring type magnetic head 22 to record or erase information.

When the recorded information is regenerating, a linear polarized light from the semiconductor laser 23 is directed through the condenser lens 24, shaping prism 25 and objective lens 27 to desired points of the horizontal magnetic film of the magneto-optic disk 51. At that time, the plane of incidence is substantially normal to the direction of magnetization effected parallel to the plane of the magnetic film longitudinally of the recording tracks of the magneto-optic disk 51. The light having a polarization P incident as a principal component on the horizontal magnetic film of the magneto-optic disk 51 will becomes a reflected light having an intensity of light corresponding to the direction and magnitude of magnetization. The reflected light irradiates a photodiode 30 through the objective lens 27 and condenser lens 29, so as to convert it into an electric signal associated with the intensity of the reflected light to regenerate information.

In focusing and tracking laser beams when recording, regenerating and erasing information, for example, cylindrical lens interposed between the condenser lens 29, quadrantal photodiode 30, are used to detect focusing servo and tracking servo signals by the astigmatism as well as the sample servo techniques.

In this embodiment, though the incident light is directed from the outer periphery of the magneto-optic disk 51 to the inner periphery thereof, the similar effect is obtainable even if the light comes from the inner periphery to the outer periphery.

The constitutional ratio of the polarized lights P and S incident on the surface of the magnetic film of the magneto-optic disk 51 is adjusted by any one of the following methods; the one is to rotate the plane of polarized light urged by allowing the semiconductor laser 23 revolve around the flux of light; the other one is to rotate the plane of polarized light by that the ½ wavelength plate inserted between the semiconductor laser 23 and the objective lens 27 is rotated by a desired amount around the flux of light; further one is to provide an incident light with an adequate phase difference by inserting a phase compensating plate such as a ¼ wavelength plate, a Babinet's compensator and the like.

In the above embodiment, the direction of magnetization parallel to the plane of the magnetic film is taken longitudinally of the tracks of the recording medium. This, however, may be directed to be normal to the tracks. That is, the ring type magnetic head 22 in FIG. 6 is turned horizontally 90°, the impression of magnetization is performed with the yoke arranged at its both ends in the direction of diameter of the magneto-optic disk 51 and the track is magnetized widthwise thereof. Then, the optical systems are also turned horizontally 90°, and the plane on which the laser beam is incident is directed normal to the magnetization.

Figure 7:
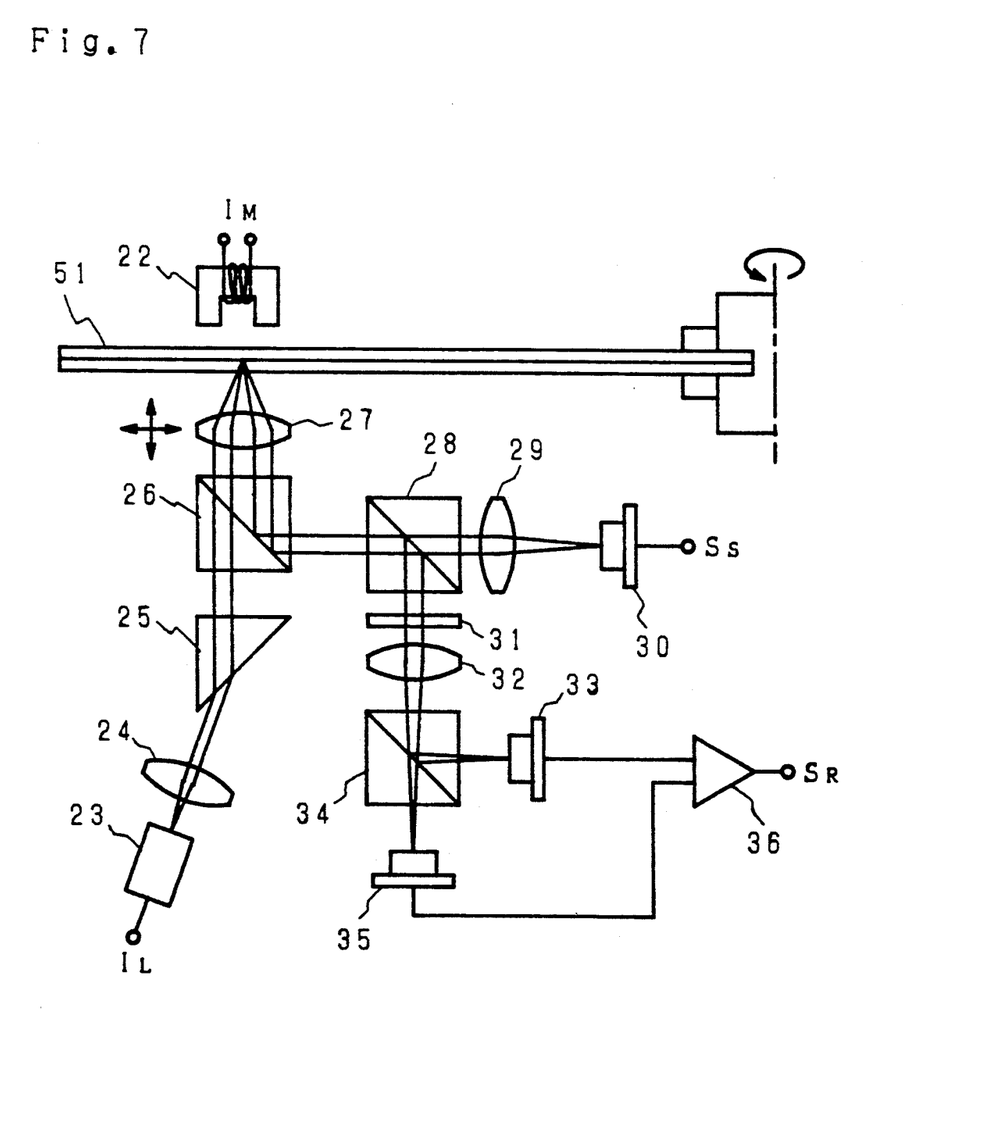
FIG. 7 is a block view showing the structure of another embodiment of the magneto-optic disk unit in accordance with the present invention.

FIG. 7 is a block diagram showing another embodiment of the magneto-optic disk unit in accordance with the present invention. In the drawing, symbols are applied to the same parts as in FIG. 6 and further description is omitted.

In the drawing, 22 designates a ring type magnetic head having a yoke arranged by its both ends diametrically of the magneto-optic disk 51 and enabling the impression of magnetization in the direction of the diameter of the magneto-optic disk 51.

The optical systems 23 to 27 are arranged so that an incident light may be directed from the outer periphery of the magneto-optic disk 51 to the inner periphery thereof and the plane on which the laser beams are incident follows the direction of magnetization.

When the recorded information is regenerated, a linear polarized light from the semiconductor laser 23 is directed through the condenser lens 24, shaping prism 25, beam splitter 26, and objective lens 27 to a desired point of the horizontal magnetic film on the magneto-optic disk 51, and then the plane of polarized light of the reflected light will rotate dependent on the direction of magnetization. The reflected light is passed through the objective lens 27, beam splitter 26, beam splitter 28, ½ wavelength plate 31 and condenser lens 32 until it is separated by a polarizing beam splitter 34 into the constituents P and S. The intensity of light of the respective separated constituents are converted by photodiodes 33 and 35 into electric signals, and a differential amplifier 36 acts to generate a signal corresponding to the rotation of the plane of polarized light from the difference between these constituents for subsequent regeneration of the information.

Part of the laser beams emitted when recording, regenerating or erasing information is passed through the beam splitter 28, and cylindrical lens 29 until it is detected by the quadrant photodiode 30 with the consequential focusing and tracking of the incident light.

FIG. 7 is a schematic view showing another embodiment of the present invention, to which the present invention may not be restricted. For example, the polarizing beam splitter 34 may be replaced by a wollaston prism, or a savart's plate, and various composition of the optical systems can be useful, and also as for the means for detecting the rotation of the plane of polarized light with the Kerr effect, it is possible to obtain a regenerating signal directly without resorting to the differential process steps.

Figure 8:
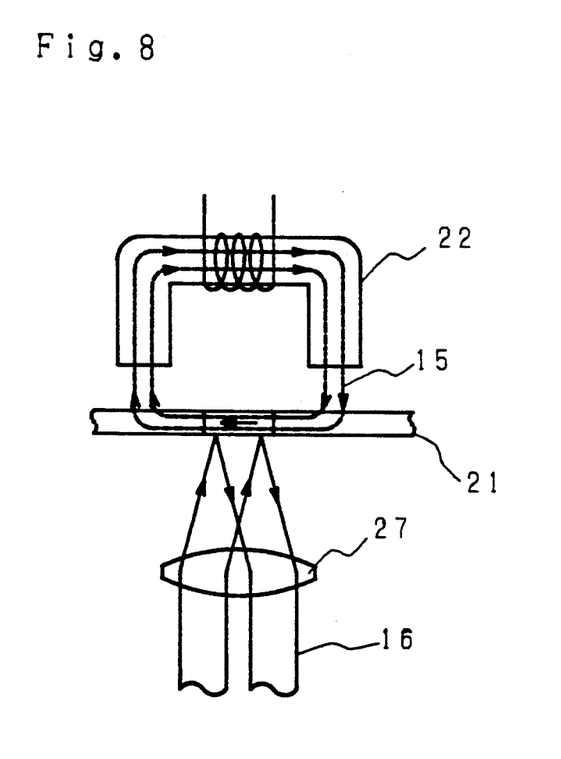
FIG. 8 is a schematic conceptional view showing a state at which the magnetic field is impressed by a ring type magnetic head.

FIG. 8 is a schematic conceptional view showing a state of impression of the magnetic field by the ring type magnetic head 22. The combination of the ring type magnetic head 22 and the horizontal magnetic film 21 can construct a closed magnetic flux circuit in which a magnetic flux 15 is discharged from one end of the ring type magnetic head 22 to pass through the horizontal magnetic film 21 until it returns home to the other end of the ring type magnetic head 22, thereby ensuring that a leakage of magnetic flux will rarely occur and the efficiency of magnetic flux will represent itself to be at a high level. A high efficiency of magnetic flux allows the application of an external magnetic field of a desired intensity to the horizontal magnetic film, therefore, a smaller number of turns of coil winding or the quantity of electricity by which a coil can be energized will do, so that the magnetic field may be high frequency-modulated and reducing the size of the magnetic field generating source is possible.

Next will be described the principle of the magneto-optic recording system in accordance with the present invention. According to the magneto-optic recording system of this invention, since the magneto-optic disk has a magnetic film adapted to be magnetized parallel to the plane of the magnetic film rather than in the direction of thickness of an extremely thin magnetic film, the distance between the magnetic poles N and S occurring on the both ends of the magnetization is long enough to greatly reduce the demagnetizing field. In this connection, the recording information parallel to the plane of the magnetic film may avoid the decrease of magnetization on even a magnetic film having a low coercive force, to ensure that a stable information recording will be effected.

Figure 10A:
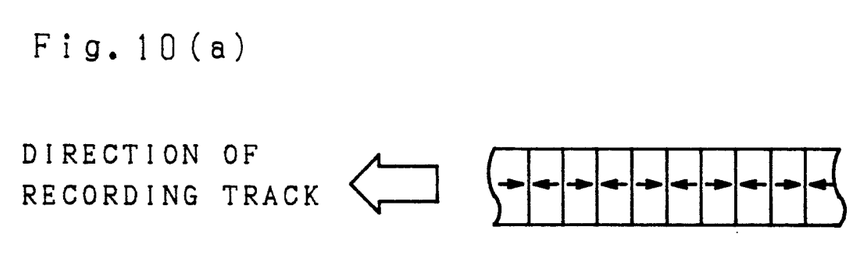
Figure 10B:
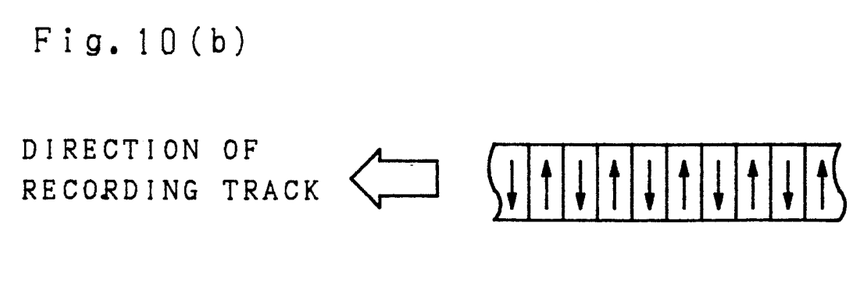

Referring to the direction of magnetization parallel to the plane of the magnetic film, two typical examples are conceivable as shown by FIGS. 10(a), (b). As illustrated in FIG. 10(a), when magnetization takes place in the direction of the recording tracks, magnetic poles are magnetized in such a manner that they will be positioned opposite to each other, thus giving rise to magnetic fields of the direction in which the recording magnetizations will mutually erase each other, thereby to reduce the recording the recording magnetization. Consequently, as shown in FIG. 10(b), in case of the magnetization widthwise of the tracks with the magnetic poles N, S alternating with each other, the magnetic poles on the same poles are not positioned opposite to each other, which avoids the necessity of a substantial coercive force and can be said to be a proper example.

For instance, this embodiment may use such as a material PtMnSb ($\theta k = \sim 1.8°$), having a greatly large Kerr effect, which have failed to be used for making magnetic films on the ground that the magnetic film used in the conventional magneto-optic disk unit had a small coercive force.

The conventional amorphous film of rare earths-transition metal has a small Kerr effect ($\theta k$) of the order of 0.2° to 0.4°.

Next, the principle of the magneto-optic recording and regenerating system in accordance with the present invention (hereinafter referred to as a method of the invention) will be described in FIG. 9 with reference to the conceptional view showing the recording method of the magneto-optic disk unit.

Figure 9:
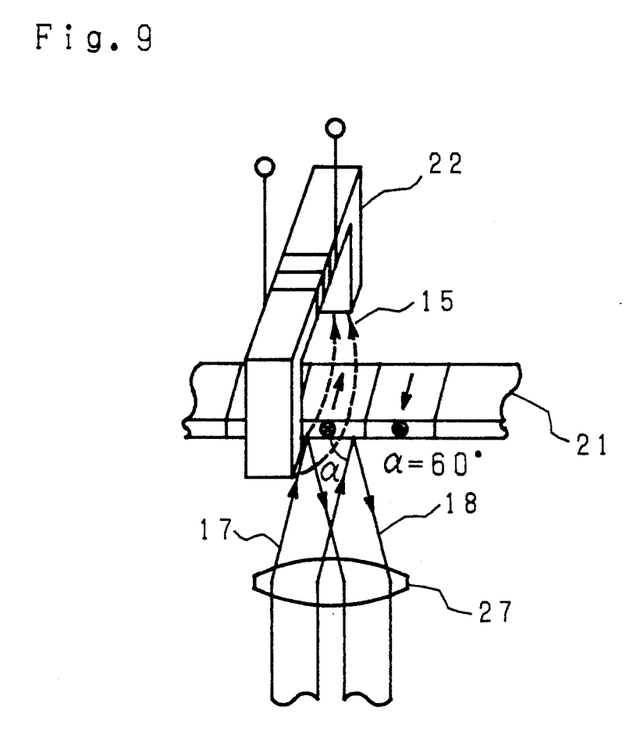
FIG. 9 is a schematic conceptional view explaining a recording method for the magneto-optic disk unit as shown by FIG. 6, and FIGS. 10a to b are schematic views showing the direction of magnetization parallel to the plane of the magnetic film.

Referring to FIG. 9, laser beams are condensed and incident by the objective lens 27 in advance in one direction, e.g. on the horizontal magnetic film 21 magnetized in the forward direction of the conceptional view, and the temperature of the irradiated area is elevated nearly to the Curie point or over to the compensating temperature in order to reduce the coercive force, and the external magnetic field 15 in the direction opposite to the direction of magnetization of the horizontal magnetic film 21, i.e. in the innermost portion of FIG. 9 is applied from the horizontal magnetization generating source, e.g. the ring type magnetic head 22 of FIG. 9 to provide a local inversion of the direction of magnetization, thereby recording information on the horizontal magnetic film 21.

On the other hand, when erasing the recorded information on the horizontal magnetic film 21, the external magnetic field in the same direction of the initial direction of magnetization of the horizontal magnetic film 21 (the forward direction of FIG. 9) is impressed and at the same time condensed laser beams are applied to erase information according to the same principle as in the recording mode.

The both recording and erasing operations may use the magnetic field generating source alone such as the ring type magnetic head capable of producing a large magnetic field, rather than using the raised temperature by irradiating laser beams.

When the information recorded on the horizontal magnetic film 21 needs to be regenerated, the use of a linear polarized light having an incident plane substantially parallel to the magnetization enables obtaining a regenerating signal output by virtue of the rotation of the plane of polarized light. This method, however, requires the rotation of the plane of polarized light to be converted to the intensity variation of light by using an analyzer and the like, and as described below, the efficiency conversion into intensity of light is inferior to that in a method without converting the rotation of the plane of polarization directly into the intensity variation of light by irradiating the linear polarized light substantially normal to the direction of magnetization. Such being the case, the following is a preferable method. That is, when a light beam 17 (angle of incidence $\neq 0°$) having for a main component a light (hereinafter referred to as polarized light P) having a plane of incidence substantially transverse to the direction of magnetization recorded in the horizontal magnetic film 21, i.e. a plane of incidence parallel to the paper surface in FIG. 9 and an electric vector parallel to the plane of incidence (P polarized light), a light with an intensity corresponding to the direction or magnitude of magnetization of the horizontal magnetic film 21 is reflected by the equatorial Kerr effect, and then the reflected light 18 is converted to an electric signal by a light receiving element to obtain a regenerating signal.

Theoretically, if the direction of magnetization is completely perpendicular to the plane of incidence, the variation of intensity of the reflected light variable with the direction or magnitude of magnetization by the equatorial Kerr effect will become maximum. Although this is the most preferable in obtaining a regenerating signal, there is an industrial limit in the precision of obtainable magnetic field generating sources, optical system or the like, whereby it is difficult to make the direction of magnetization completely perpendicular to the plane of incidence. Also, for detecting of a positioning servo signal there is a case where requires an incident light parallel to the magnetization and which intensity of light when reflected seldom varies with the direction or magnitude of the magnetization.

In consideration of the distribution balance of the amount of light, there is a case where the direction of magnetization may not be completely perpendicular to the incident plane. Therefore, the method of the invention is not restricted to the case where the direction of magnetization and the incident plane being completely perpendicular to each other.

Referring to the polarization components of an incident light, when the incident light has 100% of P polarization component as an electric vector parallel with the plane of incidence upon arrival at the surface of the magnetic film of a recording medium, the variation of the intensity of the reflected light variable with the direction or magnitude of magnetization by the equatorial Kerr effect will become maximum. Thus, it is most preferable that the incident light should have 100% of P polarization component, in view of obtaining a regenerating signal, but there will inevitably occur phase difference due to the optical parts such as lenses, the substrate materials or the like. It is also difficult to have an incident light 100% consisting of P polarization component because of the limit in industrially enabling adjustment accuracy of the optical system. The light emitted for the detection of a positioning servo signal preferably comprises an S polarization component having an electric vector perpendicular to the plane of incidence and an intensity of reflected light which does not vary with the direction or magnitude of magnetization. There is a case where the incidence of a proper amount of S polarization component is preferable in order to secure an output of a servo signal. Consequently, in accordance with the method of the invention, the incidence of the P polarization component as an electric vector parallel to the plane of incidence is indispensable for regenerating information, but 100% composition is not necessary, and all what is required is the P polarization component being as a principal component.

One example of the test results by comparing the magnitudes of regenerating signal outputs by the methods in accordance with the invention and the prior art is shown in Table 1. In Table 1, the amplification factor of an amplifier is set as 1 for comparison between the two different play-back systems and the intensity variation of the reflected light during magnetization reversal with respect to the intensity of the incident light is shown in percentage of the amplitude intensity. In this test, as magnetic films there were used thin films of Co-70at % Pt having a thickness of 50nm or thin films of Fe-25at % Pt having a thickness of 50nm, both being formed on glass substrates and the intensity variation of light with respect to the intensity of the incident light with the direction of magnetization reversed upon the entry of the light from the glass plate side was measured. In the test example according to the method of the present invention, the optical systems arranged as in FIG. 6 were used to measure, and the light consisting of 100% P polarization had been incident at an angle of 60° on the magnetic film in such a manner that a plane of incidence will be perpendicular to the direction of horizontal magnetization of the magnetic film. With the test in accordance with the conventional method, the differential method conducted by means of the magneto-optic disk unit so arranged as in FIG. 1 was employed to measure, and a linear polarized light had been incident at an incident angle of 0° on the magnetized film magnetic normal to the plane of the magnetic film.

TABLE 1

| SYSTEM | VARIATION OF LIGHT INTENSITY | |
|---|---|---|
| | Co—70Pt | Fe—25Pt |
| CLAIMED SYSTEM | 0.27% | 0.52% |
| CONVENTIONAL SYSTEM | 0.18% | 0.35% |

As is apparent from Table 1, the method of this invention has about a 1.5-fold intensity variation of light in the amplitude compared with the conventional method. Therefore, a regenerating signal can have about a 2-fold output which is proportional to the square of the amplitude intensity.

The diagonal incidence of a light with respect to the magnetized film can eliminate the return of the light to the semiconductor laser, preventing any deterioration in quality of a regenerating signal due to the noise of the returned light, and obtaining an extra effect of improving the SN ratio of the regenerating signal.

The ring type magnetic head 22, for example, as shown in FIG. 8 is used as a magnetic field generating source. This ring type magnetic head 22 constitutes a closed magnetic flux circuit wherein a magnetic flux 15 is discharged from one end of the ring type magnetic head 22, passing through the horizontal magnetic film 21, and returning to the other end of the ring type magnetic head 22. This may make a less leakage of magnetic flux with extremely high efficiency of magnetic flux. Since a high efficiency of magnetic flux permits impressing the external magnetic field of a desired intensity on the horizontal magnetic film with a smaller number of turns of coil winding or smaller quantity of electricity by which a coil can be energized, so that the magnetic field may be high frequency-modulated and miniaturization of the magnetic field generating source is possible to obtain a reduced-sized magneto-optic disc unit.

Furthermore, the facilitation of reversal of the direction of magnetic field at high frequencies enables overwrite in accordance with magnetic field modulation recording method and then the effective transfer rate of the recorded information will be higher.

Since the ring type magnetic head has an intensity of magnetic field which is less variable with the fluctuation of the distance from the head, it is effective in the magneto-optic disk unit wherein the distance between the disk and the head is inevitably changeable due to the surface vibration of the disk and the like.

Now, the characteristics of the magnetic film of the magneto-optic recording medium in accordance with the present invention will be described with reference to a schematic view of FIG. 3 showing the coercive force-temperature characteristic of the magnetic film. In FIG. 3, a, which corresponds to the present invention, shows the temperature characteristic of the magnetic film, wherein the coercive force $Hc_1$ at room temperature $T_R$ is smaller than the saturated magnetization $4\pi Ms$, and b, corresponding to the prior art, represents the temperature characteristic of the magnetic film, wherein the coercive force $Hc_2$ at room temperature $T_R$ is more than the saturated magnetization $4\pi Ms$, the both a and b being shown in approximate straight lines in the graph. The both a and b have the same Curie temperature Tc and other properties.

With the magneto-optic recording medium using the conventional perpendicular magnetic film, magnetization must be provided normal to the plane of a thin magnetic film, and therefore a magnetic film having a high coercive force as shown in FIG. 3b is required so that the recording magnetization should not be reduced by the demagnetizing field substantially equal to the saturated magnetization ($4\pi Ms$) of the magnetic film itself.

In this connection, the coercive force is high at the temperature $T_R$, the lowering of the coercive force is represented in a relatively steep gradient leading to the Curie temperature Tc, and then the temperature $Tex_2$ of the film at which the magnetization reversal can be achieved by the applied magnetic field Hex is comparatively close to the Curie temperature Tc, which means that the recording sensitivity is poor. Incidentally, the better the recording sensitivity of the magnetic film, the easier the information recording, and the lower the temperature Tex of the film at which the magnetization reversal can be achieved by the applied magnetization, the higher the recording sensitivity.

In order to improve the recording sensitivity, Tex in the magnetic film being as high as the Curie temperature should be decreased and the gradient leading to the Curie temperature Tc should be made gentle, in other words, the coercive force at room temperature should be reduced.

However, as shown in FIG. 3a if a magnetic film with a low coercive force which is smaller than the saturated magnetization $4\pi Ms$ is used as the conventional perpendicular magnetic film, the magnitude of the recording magnetization will be reduced by the demagnetizing field, and the Kerr effect will also be reduced accordingly, so that the coercive force $Hc_1$ cannot be made smaller than the saturated magnetization $4\pi Ms$ in order to secure a sufficient regenerating signal output.

On the other hand, if the horizontal magnetic film is employed for a magneto-optic recording, it is possible to render the coercive force $Hc_1$ much lower than the saturated magnetization $4\pi Ms$ because of greatly small demagnetizing field, and Tex can be lowered, thus entailing an improvement of the recording sensitivity.

That is, if the magnetic film with a low coercive force $Hc_1$ as shown in FIG. 3a is compared with the conventional magnetic film having a high coercive force $Hc_2$ in FIG. 3b based on the specific straight line approximated it is obvious that in the temperatures of film $Tex_1$ and $Tex_2$ at which the magnetization reversal can be made by the applied magnetic field Hex, the temperature of film $Tex_1$ of the magnetic film having a lower coercive force $Hc_1$ represented by a gentle-gradient straight line is extremely low to ensure that the recording sensitivity will be improved.

In other words, in the attempt of securing a similar degree of the recording sensitivity from a magnetic film having a high coercive force at room temperature and another magnetic film with a low coercive force at room temperature, the latter can be produced from a material having a comparatively high Curie temperature.

By using the magnetic film with a low coercive force, a substantial difference between the film temperature $Tex_1$ enabling the magnetization reversal and the Curie temperature Tc becomes greater, so that if the magnetic film is heated by laser beams, the magnetic film can be avoided further elevation of the temperature up to more than the Curie temperature even with energization. Thus, in the magnetic field modulation recording, since the time is not required for reducing the temperature of film to less than the Curie temperature at which the magnetization reversal is made possible, there will occur a prompt magnetization reversal in the entire area heated up higher than Tex in response to the applied magnetic field without any waiting time for cooling after heated, whereby any possible deviation of the recording or erasing position may be prevented and also the magnetization reversal at a higher frequency may easily be obtained. Now that the magnetic film is not heated up higher than the Curie temperature, even in the magnetic field modulation recording, the configuration of the magnetic domain formed by the magnetization reversal is devoid of cutouts at highly heated areas where no magnetization reversal can take place, and the magnetic domain has a configuration essentially symmetrical in the traveling direction of the laser beams or in the rotational direction of the disk, thus producing substantially simmetrical regenerating outputs for easy processing of the regenerating signals.

One example of the characteristic of the magnetic film in accordance with the present invention will be described using the numerical values. Although the PtMnSb magnetic film has a large angle of rotation of the magnetic Kerr ($\theta k = 1 - 2°$), there has been problems as follows: (1) it is difficult to make it a perpendicular magnetic film, and (2) it has a low recording sensitivity because its Curie temperature is as a high as 309° C. In applying the magnetic film as a horizontal magnetic film, however, there is no need to consider the problem (1).

The problem in the item (2) may be solved by the following reason.

As a forementioned, the Curie temperature the PtMnSb magnetic film is remarkably high as compared with that of 100° to 200° C. of the rare earths-transition metals alloy magnetic film (100°-200° ) generally used in conventional magneto-optic recording media. A film formed based on the PtMnSb magnetic film by means of sputtering as a horizontal magnetic film with a coercive force of 1000 Oe sufficiently satisfying Hc < $4\pi Ms$ have a characteristic that the film temperature Tex at which the magnetization reversal is possible at the applied magnetic field Hex of 300 Oe subjected to external impression is a comparatively low temperature of about 224° C. at which a good recording sensitivity may be secured.

Due to the fact that the film temperature Tex enabling the magnetization reversal is lower by 85° C. than the Curie temperature Tc (309° C. ), the ultimate temperature of a region with a diameter of 1 $\mu$ m heated by irradiation of laser beams is about 284° C. , namely failing to go beyond the Curie temperature. Consequently, after heating the recording or erasing position by irradiating laser beams, the magnetization reversal can be performed by the impressed magnetic field from the magnetic field generating source such as the ring type magnetic head in the entire area with the film temperature elevated higher than Tex (about 224° C.). At that time, the magnetic domain after the magnetization reversal is symmetrically shaped in the travelling direction of the laser beams or the rotational direction of the disk, thus obtaining a good symmetrical regenerating output so that it is easy to process the regenerating signals.

The described embodiments of the present invention are limited to the device using a disk, but it goes without saying that they are applicable to a magneto-optic recording medium having such a form as a card or a tape and so on.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A magneto-optic recording and regenerating apparatus comprising:

a magneto-optic recording medium;

a semiconductor laser source for irradiating laser light on said magneto-optic recording medium, the light incident to the recording medium consisting essentially of P polarization and being incident at angle of 60 degrees, an incident plane of said light being substantially perpendicular to a direction of magnetization of information recorded by the magneto-optic recording medium;

a light-receiving element for receiving light from said magneto-optic recording medium;

optical means, disposed among said magneto-optical recording medium, said semiconductor laser source and said light-receiving element, for directing said reflected light from said magneto-optic recording medium onto said light receiving element; and means for transforming intensity of said reflected light incident on said light receiving element into an electric signal.

2. A magneto-optical recording and regenerating apparatus as set forth in claim 1, wherein electric vectors of said light incident on said magneto-optical recording medium are parallel to the incident plane.

3. A magneto-optical recording and regenerating apparatus as set forth in claim 1, wherein said magneto-optical recording medium is magnetized parallel to the plane of the magnetic medium.

* * * * *